(12) United States Patent
Rundell et al.

(10) Patent No.: US 6,940,026 B2
(45) Date of Patent: Sep. 6, 2005

(54) METHOD AND SYSTEM FOR VEHICLE OCCUPANT WEIGHT SENSING

(75) Inventors: David Rundell, Brighton, MI (US); Russell C. Watts, Ann Arbor, MI (US)

(73) Assignee: Robert Bosch Corporation, Broadview, IL (US)

( * ) Notice: Subject to any disclaimer, the term of this patent is extended or adjusted under 35 U.S.C. 154(b) by 132 days.

(21) Appl. No.: 10/314,859

(22) Filed: Dec. 9, 2002

(65) Prior Publication Data

US 2004/0108146 A1 Jun. 10, 2004

(51) Int. Cl.⁷ .......................... B60R 21/32; G01G 23/14
(52) U.S. Cl. .................. 177/144; 180/273; 280/735
(58) Field of Search ................. 177/136, 144, 177/210 R, 185; 180/273; 280/735; 701/45; 702/101, 102, 173, 174

(56) References Cited

U.S. PATENT DOCUMENTS

| | | | |
|---|---|---|---|
| 5,413,378 A | * | 5/1995 | Steffens et al. ............. 280/735 |
| 5,670,853 A | * | 9/1997 | Bauer ......................... 318/286 |
| 5,714,695 A | | 2/1998 | Bruns .................... 73/862.641 |
| 5,864,295 A | | 1/1999 | Jarocha ....................... 340/667 |
| 5,991,676 A | | 11/1999 | Podoloff et al. ............... 701/45 |
| 6,000,717 A | | 12/1999 | Rayford ...................... 280/735 |
| 6,039,344 A | | 3/2000 | Mehney et al. ............. 280/735 |
| 6,040,532 A | | 3/2000 | Munch ........................ 177/144 |
| 6,056,079 A | * | 5/2000 | Cech et al. .................. 180/273 |
| 6,069,325 A | | 5/2000 | Aoki ........................... 177/136 |
| 6,070,115 A | | 5/2000 | Oestreicher et al. .......... 701/45 |
| 6,087,598 A | | 7/2000 | Munch ........................ 177/144 |
| 6,089,106 A | | 7/2000 | Patel et al. ............. 73/862.582 |
| 6,092,838 A | | 7/2000 | Walker ....................... 280/735 |
| 6,129,168 A | | 10/2000 | Lotito et al. ................ 180/273 |
| 6,161,891 A | | 12/2000 | Blakesley ................ 296/65.01 |
| 6,392,542 B1 | * | 5/2002 | Stanley ........................ 340/561 |
| 6,448,512 B1 | * | 9/2002 | Cooper ........................ 177/144 |
| 6,502,048 B1 | * | 12/2002 | Lichtinger et al. .......... 702/101 |
| 6,617,531 B1 | * | 9/2003 | Aoki ........................... 177/144 |
| 6,689,960 B2 | * | 2/2004 | Aoki ........................ 177/25.13 |

OTHER PUBLICATIONS

NHTSA, Appendix B to the Preamble—Glossary, http://www.nhtsa.dot.gov/cars/rules/rulings/AAirBagSNPRM/AppB.html, Jul. 24, 2002.

Delphi Automotive Systems, Recognition™ Passive Occupant Detection System Gen I, Feb. 2002, Delphi Automotive Systems, Kokomo, Indiana.

Kevin Jost, Delphi occupant detection for advanced airbags, Convergence 2000 Online Show Daily—Monday, http://www.sae.org/automag/convergence/delphi.htm.

Philip W. Kithil, Letter regarding, Notice 1–18, Advanced Safety Concepts, Inc., Dec. 17, 1999, Santa Fe, New Mexico.

* cited by examiner

*Primary Examiner*—Randy W. Gibson
(74) *Attorney, Agent, or Firm*—Michael Best & Friedrich LLP

(57) ABSTRACT

A method and system for estimating the weight of a seat occupant. In one embodiment, the system includes a linkage having one or more links; an actuator; a pivot driveably coupled between the links and the actuator; and a sensor coupled to the pivot and operable to sense a load at the pivot, where the sensed signal is processed to provide an output signal representative of seat occupant weight. The system provides weight estimation with reduced sensitivity to horizontal loads and may be implemented with seats having a fixed height or a plurality of powered and manual seat height adjustment mechanisms.

36 Claims, 10 Drawing Sheets

METHOD AND SYSTEM FOR VEHICLE OCCUPANT WEIGHT SENSING

FIELD OF THE INVENTION

The present invention relates to methods and systems for sensing the weight of an occupant in a seat. More particularly, embodiments of the invention relate to sensing weight based on the torque applied to a pivot.

BACKGROUND OF THE INVENTION

Many vehicles are equipped with safety devices such as airbags and seat belts to protect persons occupying seats in the vehicle. The manner in which an air bag engages the vehicle occupant during an accident may be influenced by factors such as the force with which the occupant moves against the air bag and the inflation pressure of the air bag. Examples of conditions that may effect occupant momentum and inflation pressure include vehicle dynamics (such as deceleration), and vehicle occupant characteristics such as the weight and position of the occupant.

It is known to adjust a restraint system to accommodate for the weight and position of a vehicle occupant. For example, if a seat is unoccupied, it may not be necessary to activate an air bag or other safety device associated with that seat. In addition, if a seat is occupied by a person of a particular size the deployment of a safety device may be varied accordingly. For example, a relatively large vehicle occupant may require a fully pressurized air bag during a collision, whereas a smaller occupant, such as a child, may require only a fraction of available air bag inflation pressure. In the case of an infant seated in a safety seat or car seat, it is desirable to prevent any air bag deployment due to known risks of infant injury.

One type of sensor used to sense the weight of a vehicle occupant is a resistive strain gauge sensor. With such a sensor, force or pressure is sensed based on the strain placed on resistors. Other exemplary mechanisms of sensing weight include locating multiple pressure transducers in a layer of polymer within the seat cushion, an array of flat, mat-like contact switches having contact surfaces separated by a deformable layer and within the seat cushion, and an array of piezoelectric or thin-film sensors mounted to the bottom of the vehicle seat.

SUMMARY OF THE INVENTION

A problem in prior-art systems is that sensors located within the vehicle seat may not accurately detect the weight or presence of a seat occupant. In addition, the use of multiple sensors, such as in a matrix or array, typically requires relatively complex processing electronics. Thus, a need exists for an occupant weight sensing system that utilizes relatively few sensors, provides simple and reliable force measurements, and filters undesirable force disturbances.

Accordingly, one embodiment of the invention provides a system for vehicle occupant weight sensing that includes a link, an actuator, a pivot driveably coupled between the link and the actuator, and a sensor coupled to the pivot. The sensor is operable to sense load information at the pivot and provide the load information to a processor. In other embodiments, the pivot may include a number of load sensing locations including a gear and a shaft of a motor, and the invention may be implemented with fixed height, manual height adjustment, and powered height adjustment mechanisms. An angle measurement device may be included to provide an angle measurement related to the position of the link.

Another embodiment of the invention provides a weight sensing device for seat occupant weight estimation. The device includes a linkage having an upper rail, a lower rail, first and second links, where the first and second link rotatably couple the upper rail to the lower rail. The device also includes a drive with an actuator having a shaft. One or more gears are coupled to the shaft and the linkage and a sensor or sensor module is coupled to the drive and operable to measure information based on a load, wherein the load is caused by a weight on a seat coupled to the upper rail. The device also includes a sensor or angle measurement device to measure angles of the one or more links relative to one or more of the rails.

In yet other embodiments, the invention provides a method of estimating the weight of a vehicle seat occupant. The method includes coupling a linkage to a vehicle seat, providing a load path for occupant weight that includes a pivot, and sensing a load corresponding to the occupant weight with a sensor coupled to the pivot. In addition, the method may include conditioning a signal output from a sensor, processing the signal according to linkage angle information, generating an output signal representative of occupant weight, and communicating the output signal to a vehicle controller.

These and other features and advantages of embodiments of the invention will become apparent from the drawings and detailed description.

DETAILED DESCRIPTION

Figure 1:
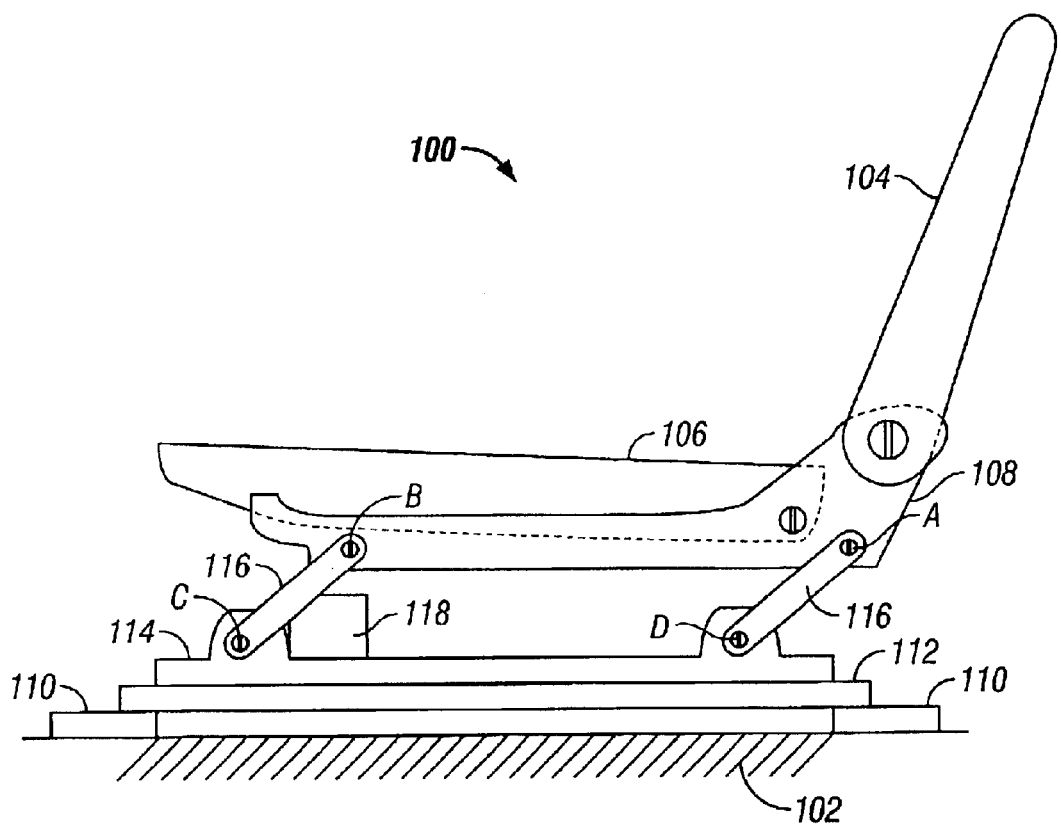
FIG. 1 illustrates an exemplary side view of a seat assembly according to one embodiment of the invention.

Before embodiments of the invention are explained in detail, it is to be understood that the invention is not limited in its application to the details of the examples set forth in the following description or illustrated in the drawings. The invention is capable of other embodiments and of being practiced or being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

In addition, it should be understood that embodiments of the invention include both hardware and electronic components or modules that, for purposes of discussion, may be illustrated and described as if all components were implemented solely in hardware. However, one of ordinary skill in the art, and based on a reading of this detailed description, would recognize that, in at least one embodiment, the electronic based aspects of the invention may be implemented in software. As such, is should be noted that a plurality of hardware and software based devices, as well as a plurality of different structural components may be utilized to implement the invention. Furthermore, and described in subsequent paragraphs, the specific mechanical configurations illustrated in the drawings are intended to exemplify embodiments of the invention and that other alternative mechanical configurations are possible.

FIG. 1 illustrates an exemplary vehicle seat 100 mounted to a floor 102, such as an interior vehicle floor. The seat 100 includes a seat back 104 and a seat pan 106 that are mounted to an upper rail 108. The upper rail 108 is coupled to the floor 102 using a fixed member or set of mounts 110, a base 112, a track 114, and a plurality of struts 116. It should be noted that a generally symmetrical mounting structure may exist on the opposing side of the seat 100 (see FIG. 2). In some embodiments of the invention, a drive 118 (such as an electric motor) is coupled to one of the struts 116 to allow height adjustment of seat 100. As noted above, the upper rail 108 is coupled to the track 114 by a set of struts 116. The struts 116 are operable to rotate about pivots A and B located on the upper rail 108 and about pivots C and D located on the track 114. In one embodiment, the upper rail 108, track 114, and struts 116 may operate as a four-bar linkage for seat height adjustment. As the struts 116 rotate, the upper rail 108 raises or lowers, with respect to the track 114, depending on the direction of rotation. As described in detail below, preferred embodiments of the invention include a sensing module and a linkage mechanism configured such that vertical force and resulting torque based information allows electronic estimation of seat occupant weight. It should be noted that the figures illustrate the use of two struts 116 merely to exemplify the operation of the four-bar linkage in relation to height adjustment and that the invention may utilize more or less than two struts 116. In addition, the seat 100 of FIG. 1 is exemplary in assembly and components such that the base 112, mounts 110, seat back 104, and additional components may be configured in a variety of ways. For example, the upper rail 108 may be integrated with the seat pan 106, the seat back 104 may be attached to the track 114, and the floor mounts 110 may include a single riser. In other embodiments, the drive 118 may be coupled to a single link connected between the seat pan and the vehicle floor. Other additional configurations may also be utilized including a fixed height seat having a fixed linkage configuration and a sensing module responding to a torque transferred from the seat through the linkage. Moreover, it should be understood that the invention is not limited to a linkage configuration and that a plurality of other seat configurations are suitable for use with the invention including collapsible and fixed support members operable to support the vehicle seat in one or more positions.

Figure 2:
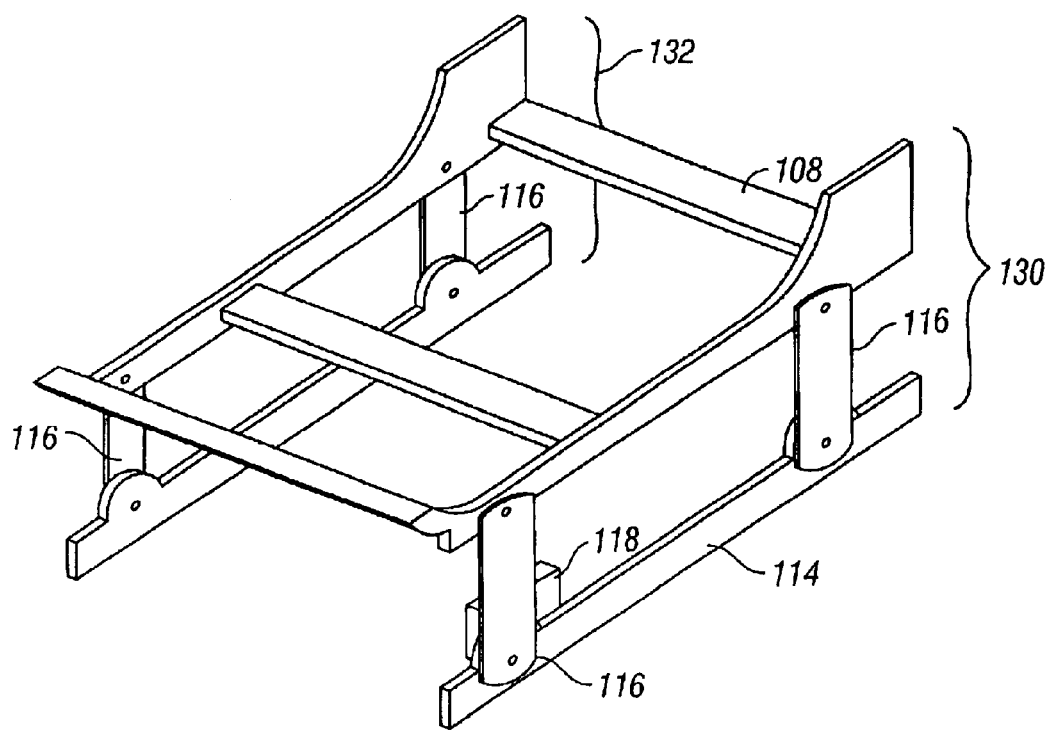
FIG. 2 illustrates a perspective view of one exemplary seat linkage associated with one embodiment of the invention.

As noted, in the embodiment shown a symmetrical mounting structure, more specifically a symmetrical linkage, may be coupled to the seat 100. FIG. 2 illustrates a perspective view of such a seat mounting assembly including a first and second four-bar linkages 130 and 132, respectively, that support the seat 100. In one embodiment, the upper rail 108 acts as a common linkage member for each four-bar linkage 130 and 132, and, therefore, couples the motion of the two linkages 130 and 132. As described above, the height adjustment of seat 100 is provided by rotation of the struts 116. If one or more of the struts 116 is constrained from movement, then linkages 130 and 132 are also constrained and the seat height is fixed. Therefore, the connection of the drive 118 to only one of the struts 116, as shown in the figures, is operable to cause rotation of the remaining struts 116.

Figure 3A:
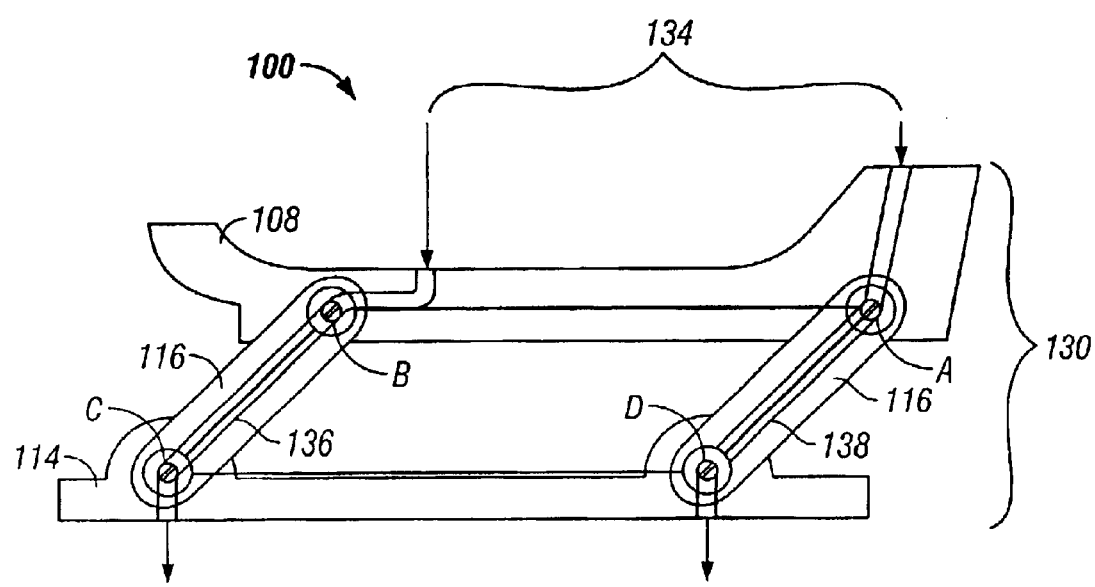
FIG. 3A illustrates an exemplary side view of a seat mounting assembly including an exemplary load path according to one embodiment of the invention.
Figure 3B:
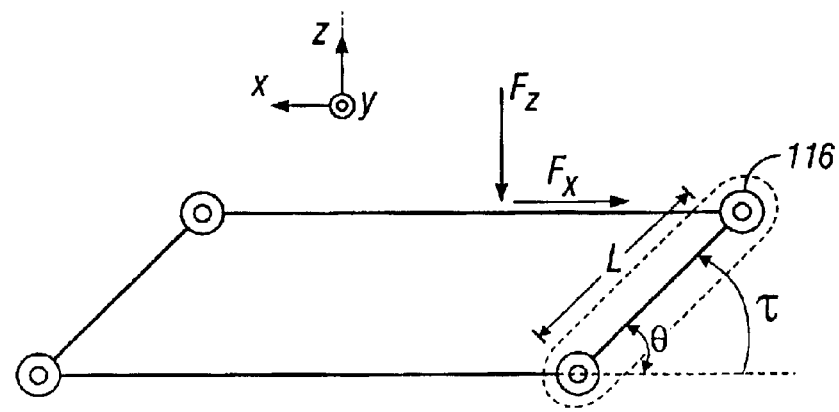
FIG. 3B illustrates an exemplary physical relationship between components in one embodiment of the invention.

FIGS. 3A and 3B are provided to illustrate the relationship between the seat mounting linkages and the force applied by a seat occupant. FIG. 3A depicts a side view of a simplified version of the four-bar linkage 130 (without drive 118 and in the form of a parallelogram) including an exemplary vertically applied load 134 (schematically illustrated using down arrows). The parallelogram is shown only for explanation of the physical relationship embodied by the linkage and is not intended to limit or imply the shape of the members comprising the linkages 130 and 132. Representative paths 136 and 138 illustrate force dispersion of an occupant's seated weight through the seat 100. In some embodiments, the linkage 130 ensures that the force resulting from the weight of the occupant is transferred from the upper rail 108 through the struts 116 and track 114, and eventually through subsequent mounting hardware to the vehicle floor. It should be noted that FIG. 3A depicts an exemplary location for force application and that although this location may vary, the load will be transferred through the struts 116. More specifically, because the track 114 is preferably fixed with respect to the floor of the vehicle, a torque is imparted on the strut 116 independent of the location of the load applied to the upper rail 108. In addition, the linkage 130 reduces the sensitivity of horizontal loads and allows estimation of occupant weight by acquiring information based on the torque imparted on a strut 116.

To further illustrate force relationships in embodiments of the invention, the exemplary parallelogram of FIG. 3A is detailed in FIG. 3B. For purposes of explanation, a coordinate frame is included to define vertical forces as being aligned with the "z-axis" and horizontal forces as being coplanar with the "x-y" plane. An exemplary force in the x and y directions includes a horizontal force applied perpendicular and parallel, respectively, to the exemplary seat back 104 (FIG. 1). The torque, $\tau$, imparted on the strut 116 is related to the angle, $\theta$, of the strut 116 as measured from a horizontal plane. In addition, the length, L, of the strut between pivot points, such as pivots A and D (FIG. 3A), and the vertical and horizontal force components, $F_z$ and $F_x$ respectively, contribute to the torque on strut 116 and may be expressed by the following relationship:

$$\tau = L \cdot F_z \cdot \cos(\theta) + L \cdot F_x \cdot \sin(\theta) \qquad \text{EQ. 1}$$

In preferred embodiments of the invention, the sensitivity to horizontal loads is reduced to preserve the accuracy of the occupant weight measurement. The horizontal loads, or disturbances, may be caused by forward, backward, or sideways accelerations. Some examples include an occupant pressing against a vehicle dashboard and other people or objects pressing against the side or back of the seat, such as seat back 104. In preferred embodiments, the effects of forces in the y direction on the sensing accuracy are reduced because those forces are parallel with the pivot axis of the linkage 130 and, therefore, do not contribute to the torque about the pivots of strut 116. With reference to FIG. 3B and EQ. 1, forces in the x direction may be reduced as the angle, θ, between the horizontal plane and the longitudinal axis of strut 116 is reduced. As one example, the sensitivity of occupant weight estimation to horizontal loads approaches zero as θ, and therefore sin(θ), approaches zero.

Figure 4A:
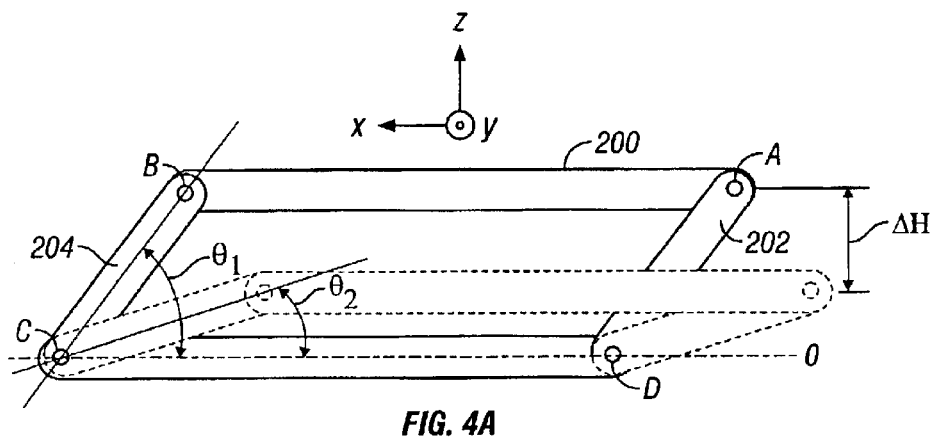
FIG. 4A illustrates two exemplary height positions according to one embodiment of the invention.
Figure 4B:
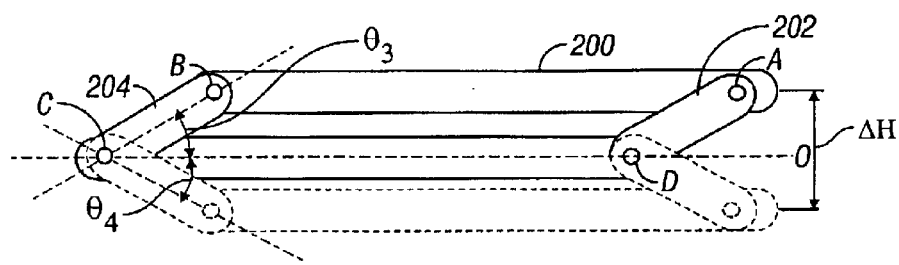
FIG. 4B illustrates two exemplary height positions according to another embodiment of the invention.

FIG. 4A illustrates one exemplary linkage configuration that may be implemented in embodiments of the invention. The linkage member 200 may be similar to upper rail 108 (FIG. 1) and is raised and lowered by rotation of linkage members 202 and 204. Members 202 and 204 may be similar to struts 116 (FIG. 1) and rotate about pivots A, D, B, and C. The rotation of members 202 and 204 causes a vertical displacement of member 200, which may be similar to a height adjustment of seat 100 (FIG. 1). Two exemplary height positions are illustrated in FIG. 4A and denoted by an angle $\theta_1$ and $\theta_2$ with respect to a horizontal reference "O," and a differential height measure ΔH. FIG. 4B illustrates similar linkage members in alternative positions utilized by some preferred embodiments of the invention. One advantage of the configuration in FIG. 4B is that a similar ΔH is achieved with smaller angles, $\theta_3$ and $\theta_4$, relative to the horizontal O, which subsequently reduces the sensitivity of horizontal loads in the x direction.

Figure 5:
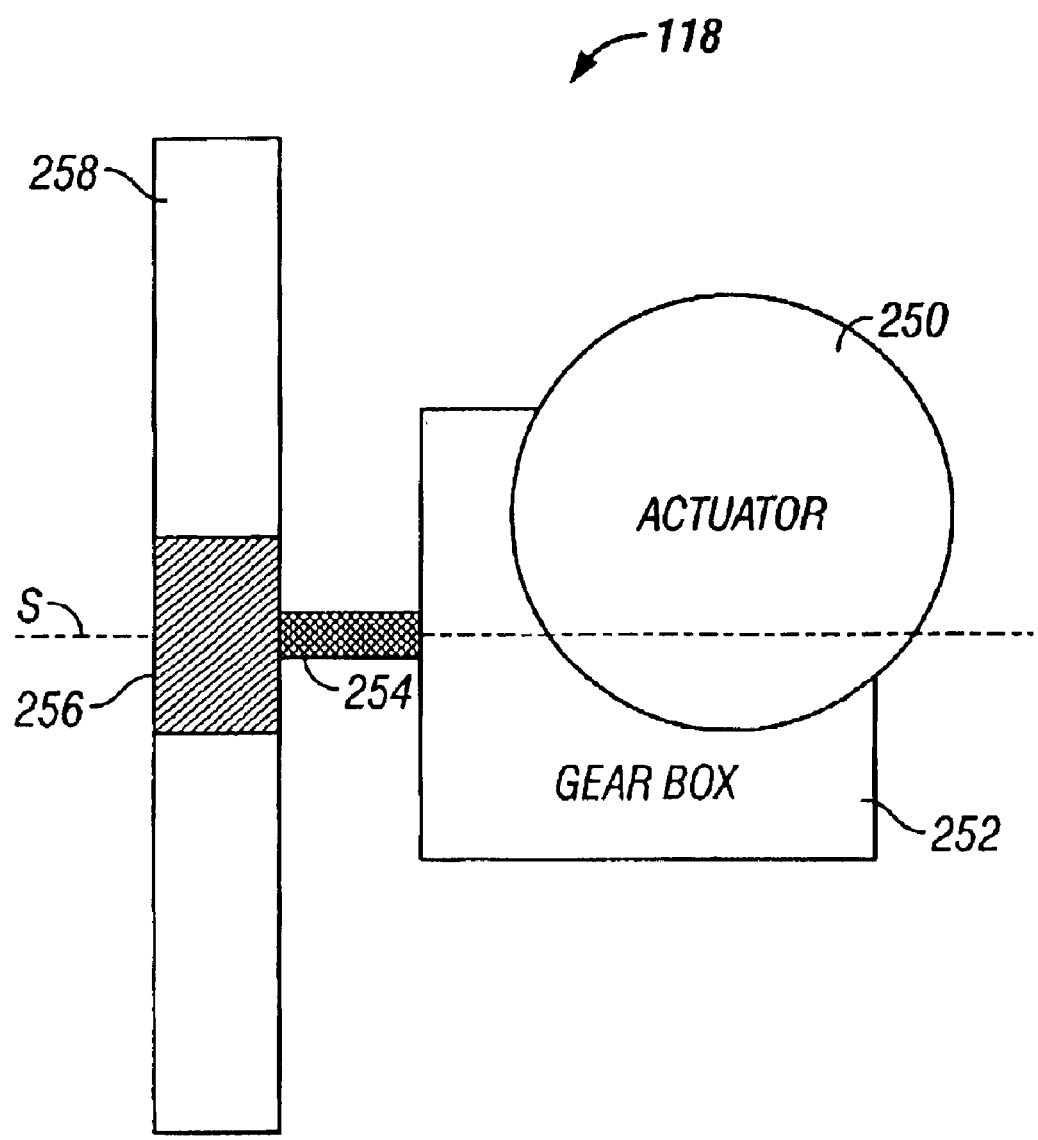
FIG. 5 illustrates components of an exemplary drive mechanism according to one embodiment of the invention.

Having described exemplary linkage configurations, embodiments of the invention related to the implementation of a linkage, such as linkage 130 and 132, and corresponding electronics to provide an output signal related to an occupant's weight will now be described. As shown in FIG. 5, an exemplary height adjustment mechanism, such as drive 118 (FIGS. 1 & 2), includes an actuator 250 coupled to a gear box 252, a drive shaft 254 that is coupled to the gear box 252 and that rotates about an axis "S," and a drive gear 256. The drive gear 256 is coupled to the shaft 254 and includes gear teeth that are in meshing engagement with a gear sector 258 (described below) that may operate as or with one or more of the struts 116. In some embodiments of the invention, the actuator 250 may include an electric motor for powered seat height adjustments. In other embodiments, the actuator 250 may be implemented with a hand operated device for manual seat height adjustments. One skilled in the art will understand that implementation of the actuator 250 is not limited to the devices noted above and that a plurality of alternatives may be utilized with the invention. In general, the actuator 250 may be any device or mechanism that is operable to rotate a shaft and/or gear. In addition, the invention may be implemented on a seat that has no height adjustment capabilities and instead utilizes the relationship of occupant force on a fixed linkage structure to estimate occupant weight.

Figure 6:
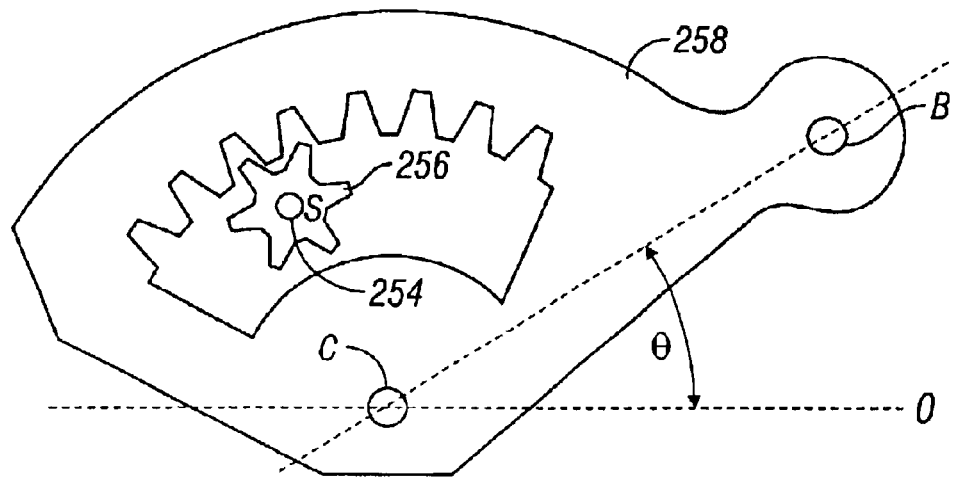
FIG. 6 illustrates an exemplary relationship between a strut and components of the drive mechanism according to one embodiment of the invention.

FIG. 6 illustrates a side view of an exemplary drive gear 256, gear sector 258, and drive axis S. The teeth of drive gear 256 engage teeth in the gear sector 258. The rotation of the drive gear 256 causes the gear sector 258 to rotate about a pivot C, which may be attached to the track 114 (FIG. 1), thereby rotating the gear sector 258 by an amount θ with respect to the horizontal surface O. As the angle θ changes, the upper rail 108 (FIG. 1) or an equivalent structure coupled to the gear sector 258 by a pivot B, moves up and down accordingly. It should be noted that the shape of the gear sector 258 shown in FIG. 6 is one of a plurality of shapes that may be utilized with embodiments of the invention. In addition, information regarding the angle, θ, may be provided as part of an existing power seat mechanism or, as with a manual drive 118, by an additional angle sensor operable to measure the angle θ. The angle information is utilized by embodiments of the invention for correlating a torque resultant on the linkage pivots, such as pivots B and C of strut 116, to the weight of the vehicle occupant.

Figure 7:
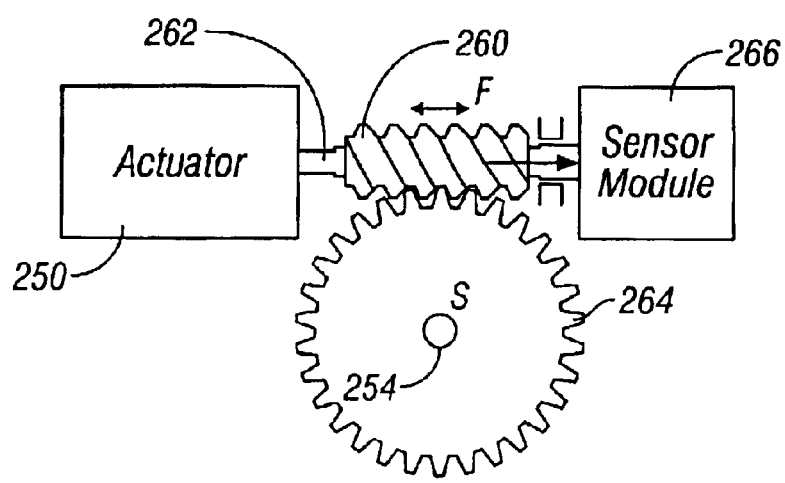
FIG. 7 illustrates exemplary components included in the drive mechanism of one embodiment of the invention.

As illustrated in FIG. 7, in some embodiments of the invention the gear box 252 may include a plurality of gears, one of which is a worm gear 260. The worm gear 260 is coupled to a shaft 262 of the actuator 250 and in meshing engagement with a gear 264. The gear 264 is preferably mounted on the shaft 254 such that rotation of the worm gear 260 is transferred to produce transverse rotation of the drive gear 256 (FIG. 6), which rotates the gear sector 258 and, therefore, raises or lowers the seat 100. The occupant's weight on the vehicle seat may impart a force on rail 108 (FIG. 1), which translates through pivot B and the strut 116, thereby creating a retarding torque on pivot C of the gear sector 258. The torque is transferred through the drive gear 256, and ultimately converted to a force along the shaft of the worm gear 260. In preferred embodiments, a sensor module 266 (FIG. 7) coupled to the shaft 262 is operable to measure the load or force imparted on the worm gear 260 or shaft 262. The sensor module 266 may include one of a plurality of sensors, including various types of strain gauges, and associated electronics. Alternatively, the force may be converted to a displacement with a known spring constant. The displacement may be measured using known techniques such as optical, eddy current, and hall effect sensing. In addition, one skilled in the art will understand that a variety of other sensors and associated electronics are available from a plurality of manufacturers including piezo-electric sensors, variable conductive pressure sensors, load cells, and the like, and may be implemented with embodiments of the invention.

Figure 8:
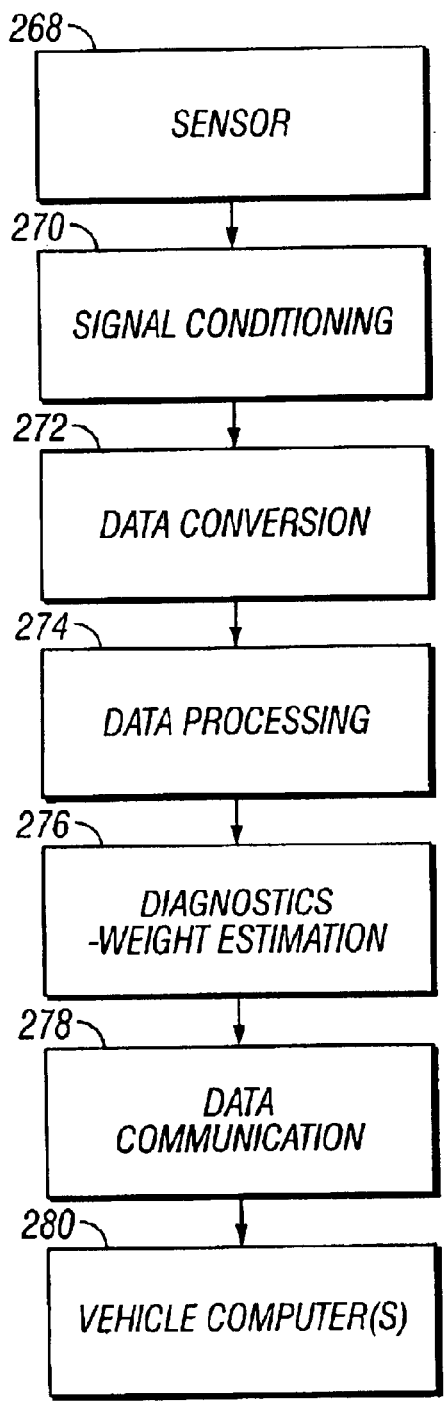
FIG. 8 is a flowchart of exemplary data-flow for estimating occupant weight according to one embodiment of the invention.

FIG. 8 illustrates an exemplary flow of information between the sensor module 266 and one or more vehicle controllers or computers 280. In general, the data flow may include a signal conditioning step 270, a data conversion step 272, a data processing step 274, a diagnostics step 276, and a communication step 278. In one embodiment, an analog sensor signal is conditioned in step 270 to preserve signal integrity by, for example, filtering analog noise. The conversion step 272 includes receiving and converting an analog signal into a digital signal or other format required for further processing. At the data processing step 274, the signal may be augmented by applying calibration and compensation techniques, as well as additional filtering. Finally, in steps 276 and 278 respectively, the processed signal representing load information may be combined with angle information to compute diagnostics, such as a weight estimation, and then output for communication to vehicle computers 280. It should be noted that embodiments of the invention may be implemented with a sensor having different output capability levels, or "intelligence," and, therefore, may be operable to perform one or more of the steps in FIG. 8. For example, sensor module 266 may acquire data representative of the load on the worm gear 260 (FIG. 7) and provide an analog output signal that has undergone little, if any, signal conditioning. Alternatively, sensor module 266 may include the requisite intelligence to provide a processed output signal representing occupant weight and conditioned for communication to a vehicle computer at step 278. One in the art will understand that the capability of the sensor module 266 is not limited to the examples described above and that the output signal may be provided at any of, including alternatives to, the exemplary steps in FIG. 8.

Figure 9:
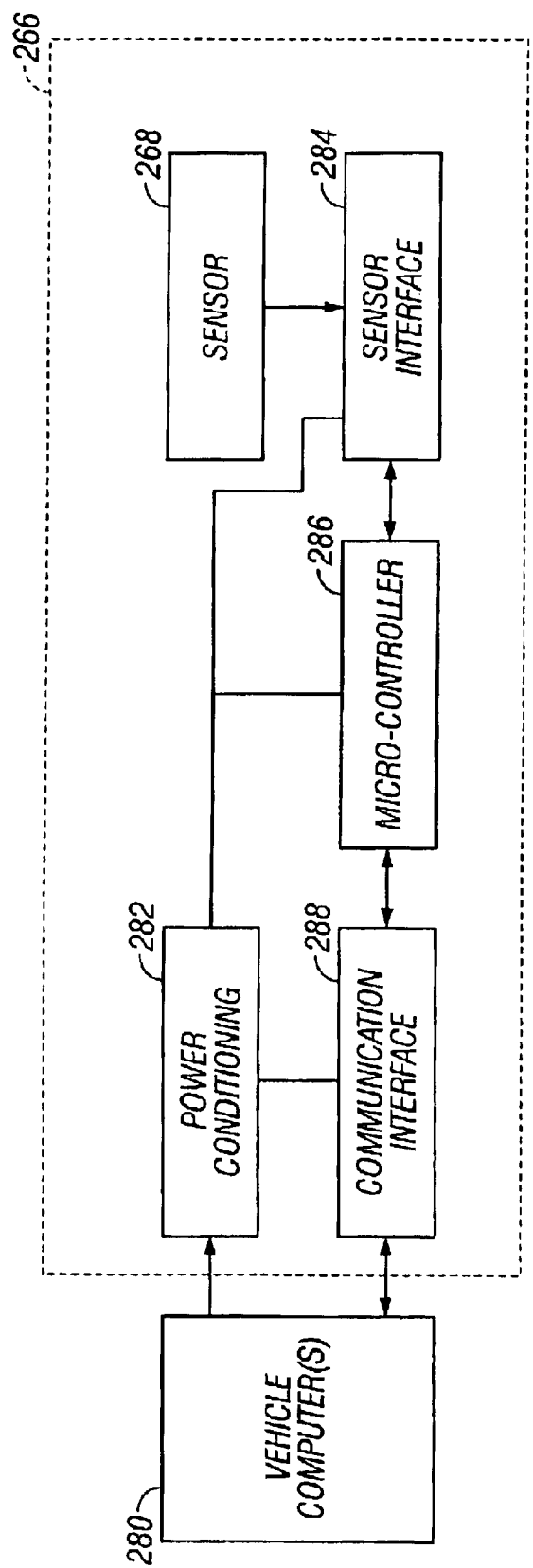
FIG. 9 illustrates exemplary components of a sensor module according to one embodiment of the invention.

FIG. 9 illustrates a high level diagram of components that may be utilized in the sensor module 266. More specifically, the sensor module 266 may include a power conditioning unit 282 that distributes power to a sensor interface 284, a micro-controller, processor, or another device (such as a PLD or logic circuit) 286 capable of processing the load information from the sensor to a value representative of the load, and a communications interface 288. As one example, an Application Specific Integrated Circuit ("ASIC") or other commercially available components, such as microprocessors, may be utilized to realize the sensor module 266 and also to perform the data operations illustrated in FIG. 8.

In other embodiments, the invention may include additional sensors (not shown) coupled to the vehicle seat 106 (FIG. 1) and operable to provide information based on occupant weight. The output signal from the additional sensors may be input to a processor, or vehicle controller, and compared with information received from the sensor module 266 or another like sensor coupled to the strut 116, a pivot of the linkage 130, or another pivot on a seat support member. The comparison of occupant weight-based data may be implemented for error checking, redundant weight estimation, filtering, or multiple other diagnostic purposes. For example, the output signal from the sensor module 266, as described above, provides weight information that is due largely to vertically imparted loads and sensitivity to horizontal loads is greatly reduced. This signal may be utilized with another weight sensing device, coupled to portions of the vehicle seat, that may or may not be operable to distinguish load angle characteristics. The comparison or combined processing of the multiple sensor or sensing device data may be used to provide accurate and filtered weight estimation signals to a vehicle controller. In addition, redundant sensor signals may be utilized for other diagnostic purposes such as calibration, load axis determination, and to provide redundant or fail-safe measures used in safety-system deployment algorithms.

Figure 10:
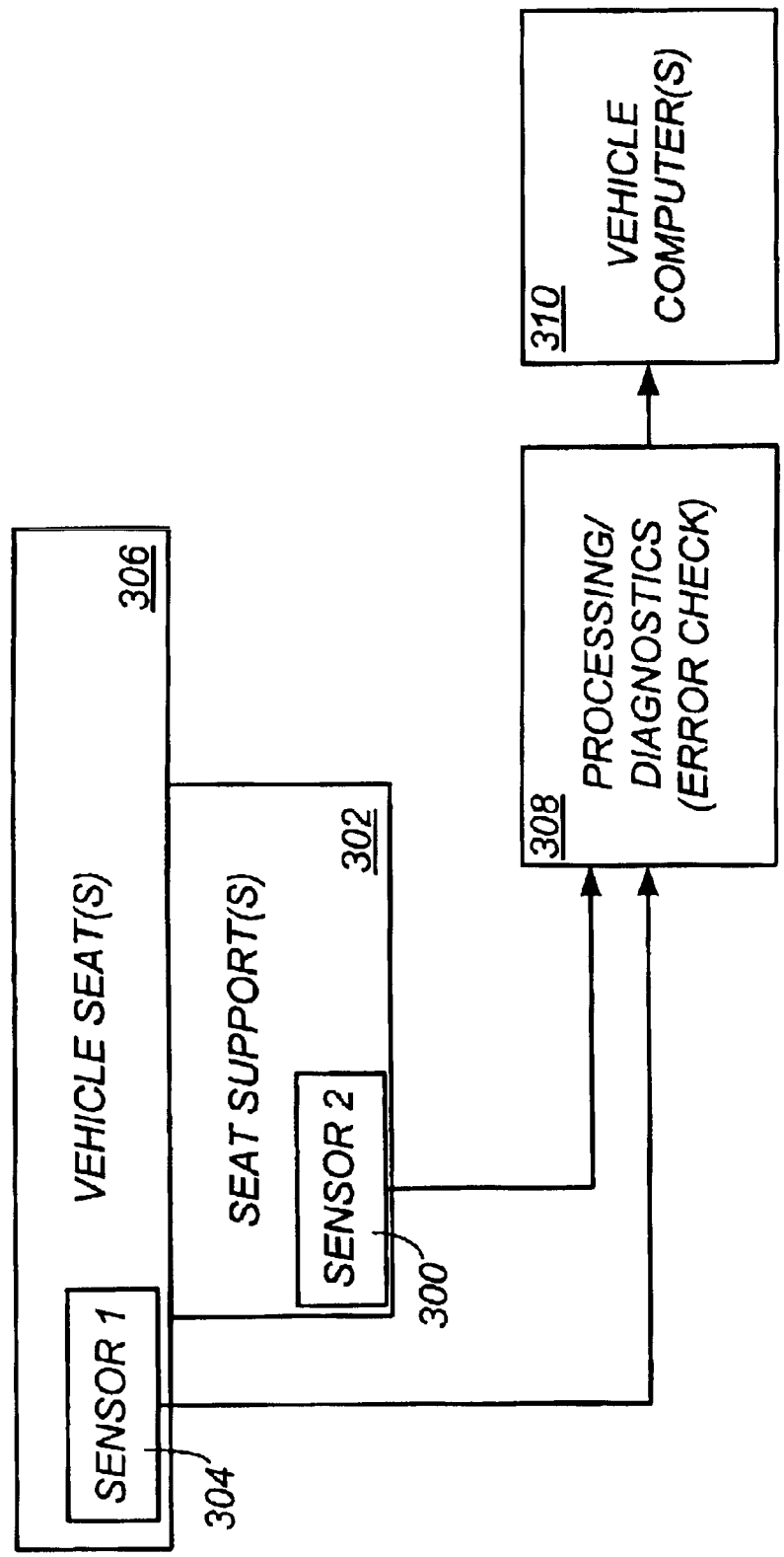
FIG. 10 illustrates exemplary sensors implemented in one embodiment of the invention.

To further illustrate the above description, FIG. 10 depicts an embodiment of the invention where a sensor 300 is coupled to a portion of a vehicle seat 302. The sensor 300 may be similar to the sensor module 266 described above. A second sensor 304 is coupled to a vehicle seat 306 and is operable to sense seat occupant load information. The second sensor 304 may include multiple sensors located at different areas about or within the vehicle seat 306, or be part of a module that may be similar to or different from sensor module 266. Examples of sensors that may be utilized with this and other embodiments include load cells, thin-film variable resistance or conductance sensors, and other various pressure or torque transducers. Referring to FIG. 10, the output of the sensor modules, or sensors 300 and 304, is received by a processor 308 and a resulting output signal is sent to a vehicle computer 310. The processor 308 may include electronics to perform functions including signal conditioning, data conversion, data processing, and weight estimation. As briefly described above, information received from the sensors 300 and 304 may be implemented with an error checking or signal redundancy process where the data from sensor 300 is compared to data received from sensor 304. This comparison may be used to determine load sensing discrepancies between sensors and the output of the processor 308 may then be used to alert the vehicle computer 310 of any errors.

Figure 11A:
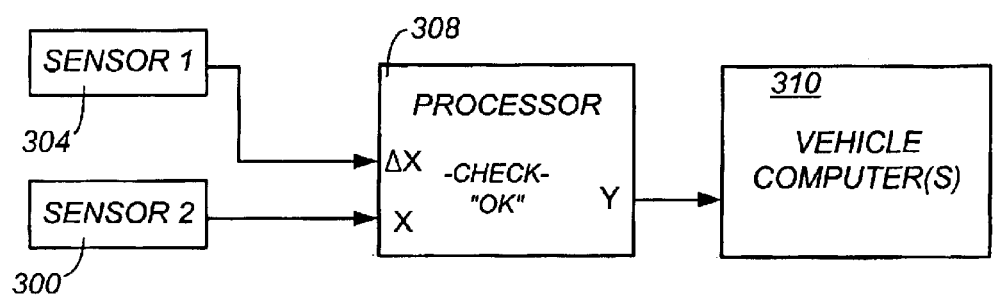
FIG. 11A depicts one exemplary embodiment of the invention that implements multiple sensors.
Figure 11B:
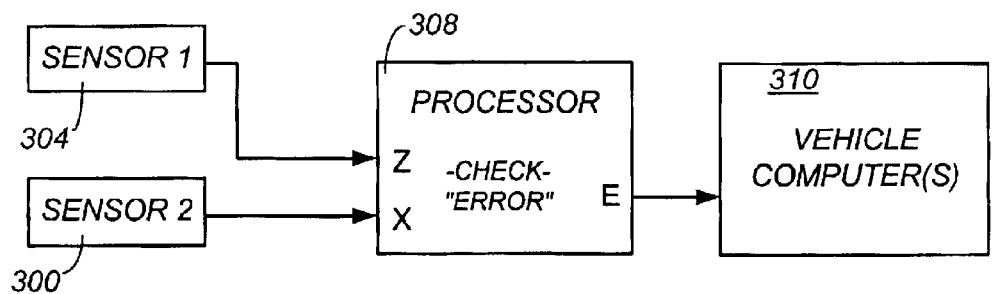
FIG. 11B depicts another exemplary embodiment of the invention that implements multiple sensors.

As one specific example, FIGS. 11A and 11B illustrate two exemplary scenarios where multiple sensors are implemented to provide additional and redundant diagnostic information for use by a controller or vehicle computer 310. FIG. 11A illustrates a case where, for a given seat load, sensor 300 outputs information "X" to the processor 308. Sensor 304 outputs information "ΔX" to the processor 308. The redundant sensor information is compared to confirm seat load information and, if "X" and "ΔX" differ within a limit or correlate based on sensor parameters, an output signal "Y", which may be a load indication, is presented to the vehicle computer 310. This signal may then be used by the vehicle computer for a plurality of purposes including authorizing or actuating an occupant safety system. In FIG. 11B, sensor 300 outputs information "X" to the processor 308, however in this scenario, sensor 304 outputs information "Z" that is significantly different from information "X." The processor 308 may then utilize the redundant sensor information to determine that a threshold difference between information received from sensor 300 and 304 has been exceeded and therefore an error may have occurred, a sensor may have malfunctioned, and the load information may be unreliable. An output signal "E" to the vehicle computer 310 may indicate such an error and, in response, the processor 308 or computer 310 may initiate correction or safety routines including routines for sensor calibration, engagement or disengagement of occupant safety systems, and alerting the vehicle occupant.

Some of the embodiments described above include implementations based on sensing force imparted on the worm gear 260. In other alternative embodiments, a load or torque may be sensed anywhere between the strut 116 and the worm gear 260. As one example, the torque imparted by an occupant's weight on a hinged link may be sensed directly at the pivot of the link. As used herein, the word pivot is used broadly and encompasses not only the points of rotation, such as pivots A, B, C, and D described above, but also encompasses all points where the applied load may be measured by a single sensor module. Measurement locations may include, but are not limited to, the gears and shafts coupled to the drive 118 including gear sector 258, gears 256, 260, or 264, actuator 250, or shaft 254 or 262. Additional locations may be considered as a pivot for force and torque sensing including shafts, gears, and couplings therebetween of alternative drive configurations.

As can be seen from the above, the invention provides a method of estimating the weight of an occupant in a seat. Various features and aspects of the invention are set forth in the following claims.

What is claimed is:

1. A weight sensing device for a seat, the device comprising:
    a link configured to be connected between the seat and the floor;
    an actuator;
    a pivot driveably coupled between the link and the actuator; and
    a sensor coupled to the pivot, operable to sense load information at the pivot, and provide the load information to a processor.

2. The weight sensing device of claim 1, wherein the pivot is a gear.

3. The weight sensing device of claim 1, wherein the pivot is a shaft of a motor.

4. The weight sensing device of claim 1, further comprising a linkage, the linkage including the link and a second link, and wherein one of the link and second link includes a gear sector having a toothed portion.

5. The weight sensing device of claim 4, wherein the toothed portion of the gear sector is operable to receive a gear coupled to the actuator in a meshing engagement.

6. The weight sensing device of claim 4, wherein the link and second link are fixed.

7. The weight sensing device of claim 1, wherein the actuator is part of a powered seat adjustment mechanism.

8. The weight sensing device of claim 1, wherein the actuator is part of a manual seat adjustment mechanism.

9. The weight sensing device of claim 4, further comprising a sensor operable to sense the angle of one of the link and second link relative to a known reference.

10. The weight sensing device of claim 1, wherein the load measured by the sensor includes at least one of either a linear force, torque, or combination thereof.

11. A weight sensing device for seat occupant weight estimation, the device comprising:
    a linkage including;
        an upper rail;
        a lower rail;
        a first and second link, wherein said first and second link rotatably couple the upper rail to the lower rail;
    a drive including;
        an actuator having a shaft;
        one or more gears coupled to the shaft and the linkage;
    a sensor module coupled to the drive and operable to measure information based on a load, wherein the load is caused by a weight on a seat coupled to the upper rail; and
    an angle measurement device.

12. The device of claim 11, wherein the drive is part of a manual seat adjustment mechanism.

13. The device of claim 11, wherein the angle measurement device is operable to provide a signal representative of an angle between one of the first and second links and the lower rail.

14. The device of claim 11, wherein the drive is part of a powered seat adjustment mechanism.

15. A weight sensing device for seat occupant weight estimation, the device comprising:
    a linkage coupled to a portion of a seat;
    at least one pivot, wherein the pivot couples at least a portion of the linkage to a fixed member; and
    a sensor module coupled to the fixed member and pivot, operable to receive information based on a torque about the pivot and output a signal related to seat occupant weight.

16. The device of claim 15, wherein the torque sensed by the sensor module is representative of vertical and horizontal loads imparted on the seat.

17. The device of claim 15, wherein the amount of sensed horizontal load is significantly less than the amount of vertical load sensed by the sensor module.

18. A weight sensing device for a seat of a vehicle, the device comprising:
    one or more collapsible support members operable to support the seat in a non-collapsed condition and at a position relative to the vehicle floor;
    an actuator coupled to the one or more collapsible support members for moving the seat relative to the vehicle floor; and
    a sensor coupled to a pivot of the one or more collapsible support members, and operable to sense load information and provide the load information to a processor.

19. The device of claim 18, wherein the device further comprises a drive coupled to the one or more collapsible support members and the vehicle floor.

20. The device of claim 19, wherein the drive is part of a manual seat adjustment mechanism.

21. The device of claim 19, wherein the drive is part of a powered seat adjustment mechanism.

22. The device of claim 18, wherein the device further comprises an angle measurement device operable to provide a signal representative of an angle between the one or more collapsible supports and a known reference.

23. A weight sensing device for seat occupant weight estimation, the device comprising:
    a linkage including;
        an upper rail;
        a lower rail;
        a first and second link, wherein said first and second link rotatably couple the upper rail to the lower rail;
    a drive including;
        an actuator having a shaft;
        one or more gears coupled to the shaft and the linkage;
    one or more first sensors coupled to a seat;
    a pivot driveably coupled between the linkage and the actuator; and
    a second sensor coupled to the pivot, and operable to sense load information at the pivot and provide the load information to a processor, wherein the load information is provided independent from the data sensed by the one or more firs sensors, and the data sensed by the second sensor is used for error checking.

24. The device of claim 23, wherein the second sensor senses a torque representative of vertical and horizontal loads imparted on the seat.

25. The device of claim 23, wherein the amount of sensed horizontal load is significantly less than the amount of vertical load sensed by the sensor module.

26. A weight sensing device for seat occupant weight estimation, the device comprising:
    a linkage coupled to a portion of a seat;
    one or more first sensors coupled to the seat;
    at least one pivot, wherein the pivot couples at least a portion of the linkage to a fixed member; and
    a second sensor coupled to the fixed member and the at least one pivot, operable to receive information based on a torque about the pivot and output a signal related to seat occupant weight, wherein the signal is provided independent from the data sensed by the one or more first sensors.

27. The device of claim 26, wherein the signal from the second sensor is part of an error checking system.

28. A weight sensing system for a seat of a vehicle, the system comprising:
    one or more support members operable to support the seat at a position relative to the vehicle floor;
    an actuator coupled to the one or more support members for moving the seat relative to the vehicle floor;
    a first sensor module coupled to the seat and operable to output load information to a processor; and
    a second sensor module coupled to a pivot of the one of the one or more support members, and operable to sense load information and provide the load information to the processor; wherein the sensed load information is from substantially vertical imparted loads.

29. The system of claim 28, wherein the second sensor module further includes an angle measurement device.

30. The system of claim 28, wherein the load information from the second sensor module is part of an error checking system.

31. The system of claim 28, wherein the actuator is part of a manual seat adjustment mechanism.

32. The system of claim 28, wherein the actuator is part of a powered seat adjustment mechanism.

33. A weight sensing system for a seat of a vehicle, the system comprising:

one or more support members operable to support the seat at a position relative to the vehicle floor;

a first sensor module coupled to the seat and operable to output load information to a processor; and a second sensor module coupled to one of the one or more support members, and operable to sense information resulting from loads transferred through the one or more support members and provide the load information to the processor;

wherein the load information from the first sensor module and second sensor module is processed to provide seat load information to a vehicle controller and is used to error check one or both of the first sensor module and second sensor module.

34. The system of claim 33, wherein the system further comprises an actuator coupled to the one or more support members for moving the seat relative to the vehicle floor;

wherein the actuator is part of one of a manual or powered seat adjustment mechanism.

35. The system of claim 33, wherein the first sensor module includes one or more first sensors.

36. The system of claim 33, wherein the first sensor module includes one or more pressure transducers.

* * * * *